UNITED STATES PATENT OFFICE.

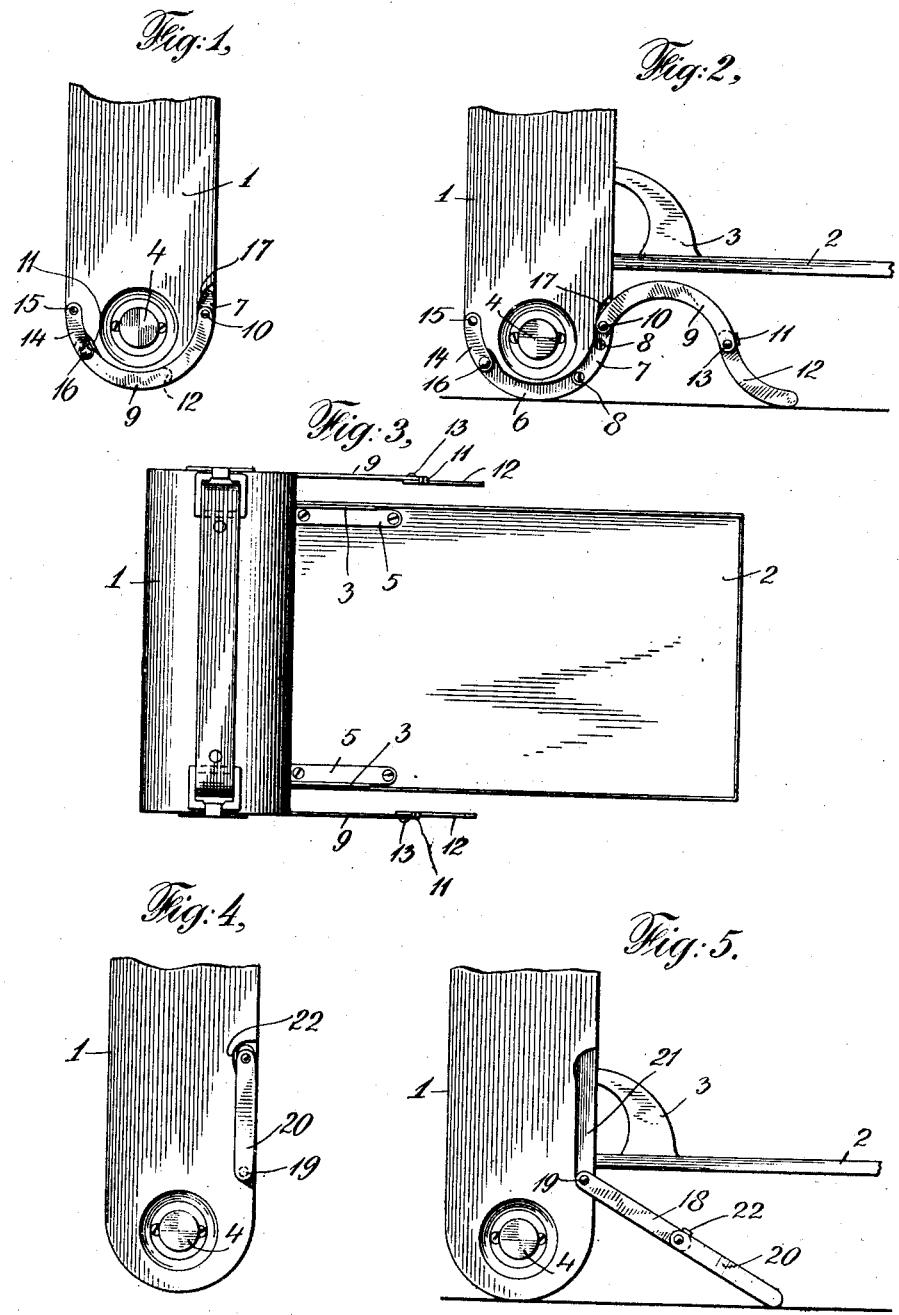

CARL BORNMANN, OF BINGHAMTON, NEW YORK, ASSIGNOR TO ANSCO COMPANY, OF BINGHAMTON, NEW YORK.

PHOTOGRAPHIC CAMERA.

1,037,722. Specification of Letters Patent. Patented Sept. 3, 1912.

Application filed January 12, 1912. Serial No. 670,909.

*To all whom it may concern:*

Be it known that I, CARL BORNMANN, a citizen of the United States, and a resident of the city of Binghamton, county of Broome, and State of New York, have invented certain new and useful Improvements in Photographic Cameras, of which the following is a full, clear, and exact description.

This invention relates to folding cameras and has for its object improved means for supporting the camera during exposures. The devices are so constructed and arranged that they act not only as efficient supports for the camera, but also improve its appearance and reinforce its lower corners which are especially liable to injury and defacement by wear.

In the drawings Figure 1 illustrates an edgewise elevation of the lower end of a folding camera, showing the invention in its closed or folded position; Fig. 2 illustrates the apparatus as in Fig. 1, the parts extended as in use; Fig. 3 illustrates a plan view of that which is shown in Fig. 2; Fig. 4 illustrates an edgewise elevation of a modification; Fig. 5 illustrates the apparatus as in Fig. 4, the parts extended as in use.

Referring first to Figs. 1 to 3, inclusive, 1 represents the camera body, 2 the folding front thereof, 3 a brace for the front, 4 one of the pin journals for one of the spools, and 5, 5, the hinges for the folding front. All the above parts may be of any preferred form and construction.

6 is a curved recess made in each lower edge of the camera body, following the contour of the end of the body. 7 is a small metallic plate fastened in this recess by screws 8, or in any other preferred manner. 9 is a curved piece of metal, the curvature of which conforms generally with that of the camera body. It is pivoted to the plate 7 by a pivot 10. 12 is a reversely curved piece of metal pivoted to the free end of the piece 9 by a pivot 13 and it is provided with a laterally projecting stop 11.

14 is a little spring clip fastened to the end of the camera body by a screw 15, or otherwise, as preferred. It is provided near its free end with an indentation 16. 17 is an outwardly projecting stop on the plate 7.

The operation of the parts above described is as follows, it being understood that they are preferably, but not necessarily, duplicated on the opposite lower edges of the camera: When the camera is not in use the front board is, as usual, folded up against the camera body and the part 12 of the support is folded back upon the part 9 and both together are then folded into the recess in the body part and are there held by the rounded end of the pivot 13 which connects the parts 9 and 12, entering into the indentation 16 in the spring clip 14, whereby the parts will be held in their then position and they will then act as a metallic reinforce or binding for the edges of the lower end of the camera, which are especially liable to injury and wear and at the same time give a finished and expensive appearance to the camera. When it is desired to support the camera for an exposure, the front board is lowered, as usual, and the jointed pieces 9 and 12 are swung outwardly into the position shown in Fig. 2, which they will maintain, being supported and held by the stops 17 and 11, for they preclude further opening or swinging movement, and when in this position, they efficiently operate as a support or brace for the camera, maintaining it in upright position, as shown in Fig. 2, and also since the supports, when extended, are in the same planes as those of the sides of the camera, these same supports will suitably sustain the camera when resting on its side for horizontal exposures. After the exposure has been made, the parts are folded again and returned to their initial position, as shown in Fig. 1.

In Figs. 4 and 5, I show a modified construction. In them there are two folding support members as before, the member 18 being pivoted to the body of the camera and the member 20 pivoted to it. The member 18 is preferably pivoted to the camera body by a substantial screw 19. When not in use, both members fold back into a recess 21 made in the edge of the camera body as shown in Fig. 4, and when in use they are projected, as shown in Fig. 5. A stop 22 on the part 18 will limit the swing of the part 20 and hold it in the position shown. The part 18 may be prevented from undue swinging in any suitable manner, but preferably by the mere friction of the pivot screw 19 which for this reason I make of substantial size and thread it into a metallic nut (not shown) on the inside of the camera, whereby it may be set up tight and made to exert the needful friction on the member 18, should it become too loose by wear. This friction will also hold the members 18 and 20 in the recess 21 when not in use and folded within that recess.

I prefer the construction shown in Figs. 1 to 3, over that shown in Figs. 4 and 5, but it will be observed that in them both the supporting devices are connected to and supported by the body of the camera and not by the movable front board, hence more secure and reliable support is secured and also that in the form shown in Figs. 1 to 3 the parts when not in use act as metallic reinforces or bindings for the lower edges of the camera, which are peculiarly liable to injury, and that they also improve the appearance of the camera.

It will be obvious to those who are familiar with such matters that alterations may be made in the details of construction of that which I describe and illustrate without departing from the essentials of the invention. I therefore do not limit myself to such details.

I claim:

1. In a folding camera, a folding support made to conform to the shape of the edge of the camera and pivoted to the camera body at one edge thereof.

2. In a folding camera, a support formed of a plurality of pieces pivoted together and so shaped as to conform to the shape of the edge of the camera and one of them pivoted to the body of the camera at one edge thereof.

3. In a folding camera, a support pivoted to the body of the camera and so shaped and located that when folded it shall act as a metallic reinforce or edging therefor.

4. In a folding camera, an extendible folding support formed of a plurality of parts pivoted together, one of them being pivoted to the camera body, said parts being so shaped and located that when folded, they shall act as a metallic edging for the lower end of the camera, stops to limit the extension of the said pivoted parts, and means to hold the parts when folded, against the body of the camera.

In testimony whereof I have signed my name to this specification in the presence of two subscribing witnesses.

CARL BORNMANN.

Witnesses:
GEO. W. FOPIFF,
H. P. MOXON.